United States Patent [19]
Wigley

[11] 3,952,077
[45] Apr. 20, 1976

[54] LIQUID COOLER DEVICES
[75] Inventor: Albert Frederick Wigley, London, England
[73] Assignee: Serck Industries Limited, Birmingham, England
[22] Filed: May 21, 1974
[21] Appl. No.: 472,049

Related U.S. Application Data
[63] Continuation-in-part of Ser. No. 141,339, May 7, 1971, abandoned.

[30] Foreign Application Priority Data
May 7, 1970 United Kingdom............... 22192/70

[52] U.S. Cl............................... 261/112; 261/79 A; 428/73; 428/178; 428/183
[51] Int. Cl............................................. B01d 47/00
[58] Field of Search ............ 261/112, 79 A; 161/68, 161/127, 133; 428/73, 116, 178, 183, 182

[56] References Cited
UNITED STATES PATENTS

| 538,557 | 4/1894 | Theisen | 261/112 |
| 1,867,933 | 7/1932 | Wilton | 261/79 A |
| 3,227,429 | 1/1966 | Renzi | 261/112 |
| 3,260,511 | 7/1966 | Greer | 261/112 |
| 3,346,246 | 10/1967 | Loetel et al. | 261/112 |
| 3,415,502 | 12/1968 | Munters | 261/112 |
| 3,485,485 | 12/1969 | Faigle | 261/112 |
| 3,540,702 | 11/1970 | Kawasaki | 261/112 |
| 3,589,687 | 6/1971 | Leybourne | 261/79 A |
| 3,618,778 | 11/1971 | Benton | 261/112 |
| 3,704,869 | 12/1972 | Priestly | 261/112 |

Primary Examiner—Tim R. Miles
Assistant Examiner—Gregory N. Clements
Attorney, Agent, or Firm—Brady, O'Boyle & Gates

[57] ABSTRACT

A packing for a gas/liquid contact apparatus, particularly a cooling tower, comprising corrugated sheets assembled together to form a honeycomb structure. The sheets are formed with transverse ribs which project into the tubes of the honeycombs and which define liquid passages communicating between adjacent tubes. The sheets are also formed to provide the tubes with spiral guide surfaces which impart rotational motion to the gas.

8 Claims, 9 Drawing Figures

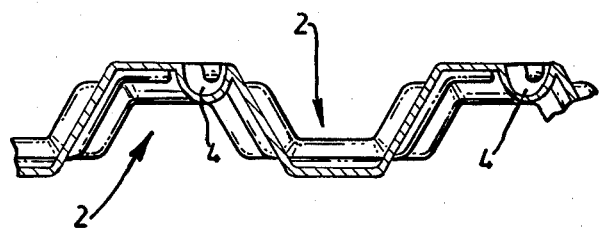
FIG.2.
FIG. 3.
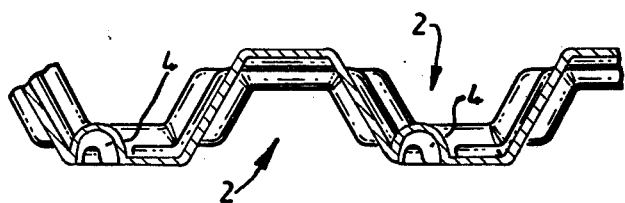
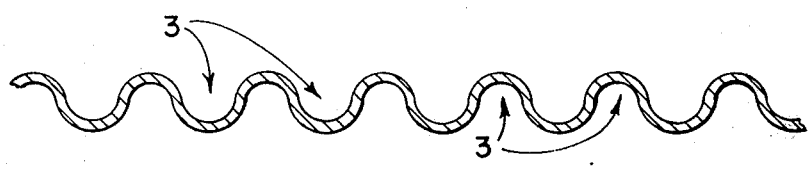
FIG. 4.
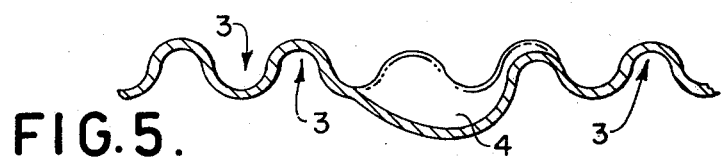
FIG.5.

LIQUID COOLER DEVICES

This application is a continuation-in-part of my copending application Ser. No. 141,339, filed May 7, 1971, now abandoned.

This invention relates to apparatus for use in effecting contact between a gas and a flowing liquid film, more particularly but not exclusively for effecting heat transfer between the gas and liquid, such as in a water cooling tower.

According to the invention there is provided a packing sheet for use in apparatus wherein a film of liquid flows in counter-current to a gas stream to effect contact therebetween, the sheet being corrugated to define a plurality of parallel depressions which are generally segmental in cross-section, the sheet also being deformed to provide channels communicating between the depressions, to provide transverse ribs which project from the walls of the depressions, and to provide obliquely extending projections in the wall of the depressions.

An example of gas liquid contact packing according to the invention will now be described with reference to the accompanying drawings, in which:

FIG. 2 is a sectional plan view taken on line A—A of FIG. 1;

FIG. 3 is a sectional plan view taken on line B—B of FIG. 1;

FIG. 4 is a sectional side view taken on line C—C of FIG. 1;

FIG. 5 is a sectional side view taken on the line D—D of FIG. 1;

Figure 1:
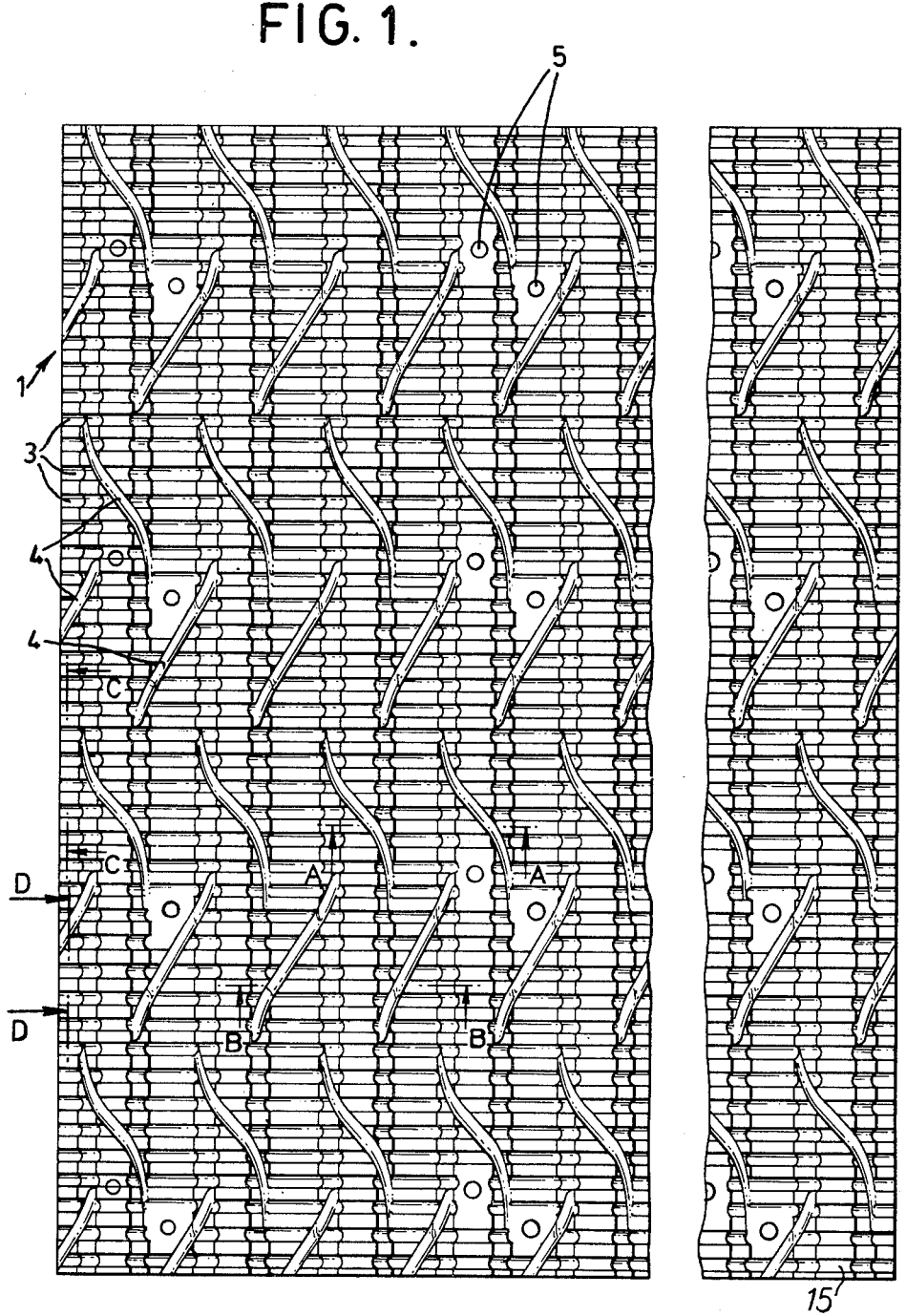
FIG. 1 is a front view of a packing sheet.
Figure 6:
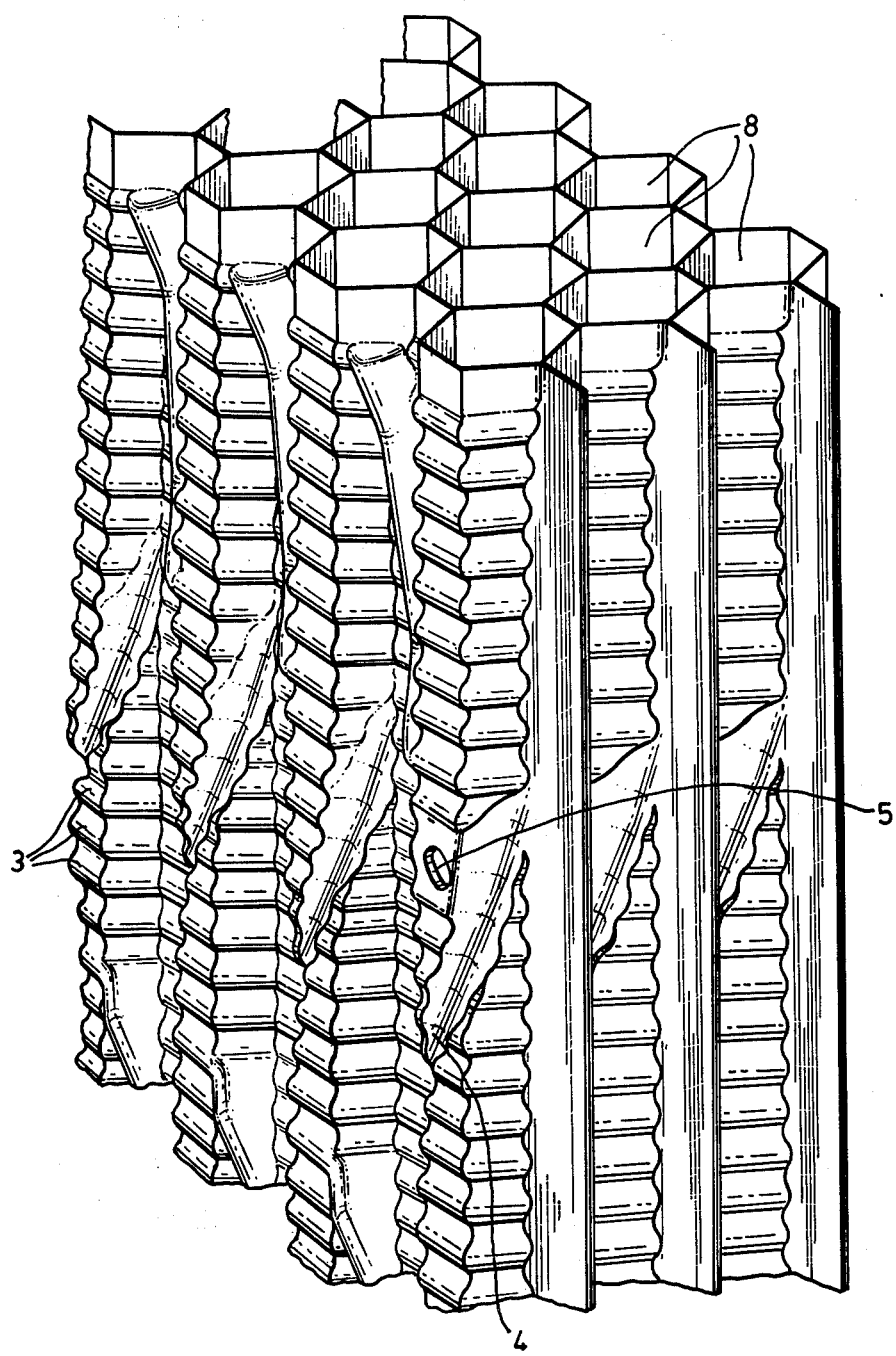
FIG. 6 is a scrap perspective view of a gas/liquid contact packing made up from a number of the packing sheets as shown in FIGS. 1 to 4.
Figure 7:
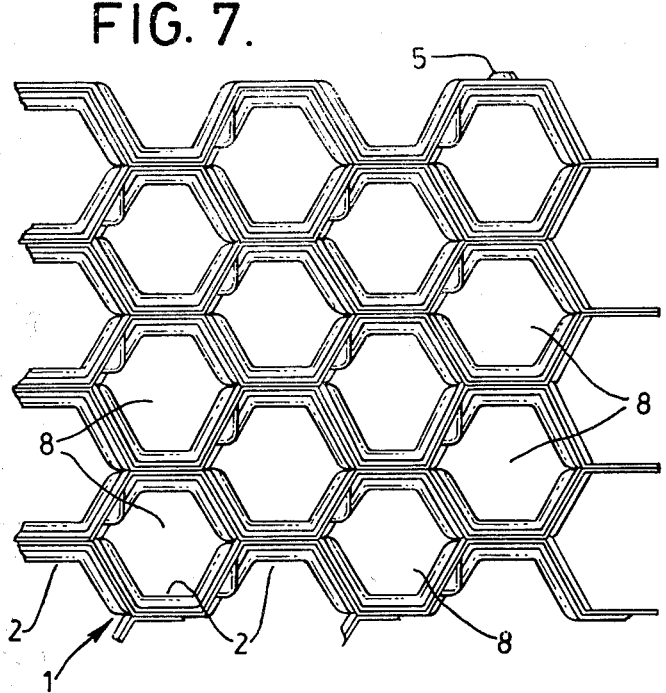
FIGS. 7 and 8 are respectively a scrap plan view and a scrap side view of the packing of FIG. 6.
Figure 8:
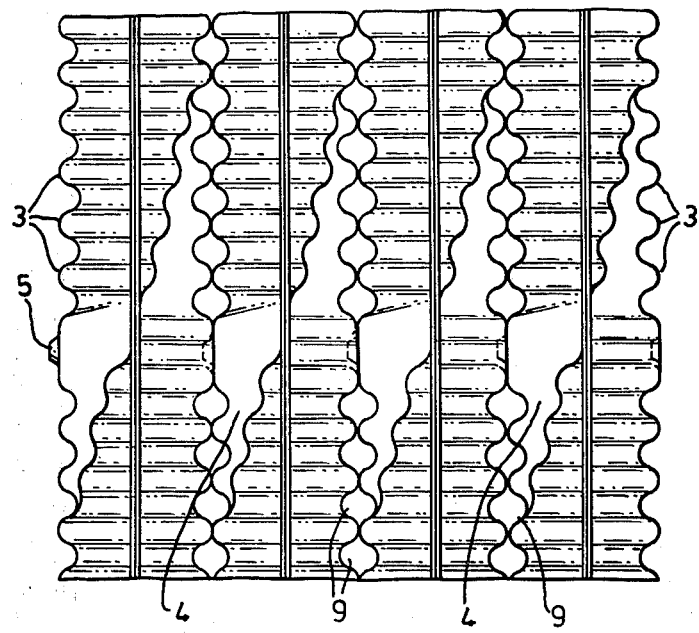

FIGS. 1 to 4 of the drawings show a generally rectangular packing sheet 1 for gas/liquid contact apparatus, the sheet being of a thermoplastics material, e.g. polyvinylchloride, and being vacuum-formed to the shape shown in the drawings. Alternatively however the sheet could be of aluminum. The sheet is longitudinally deformed to provide a regular series of mutually parallel corrugations 2 which are generally segmental in cross-section and which are best seen in FIGS. 2 and 3, each of which is shaped in section as a truncated cone. Transversely the sheet is formed with a regular series of corrugations 3 which are small in relation to the size of the corrugations 2 and which are semi-circular in cross-section, see FIG. 4. The corrugations 3 extend across the sheet from edge to edge and thus the walls of the corrugations 2 are corrugated along their lengths to provide channels communicating between the corrugations 2 and to provide transverse ribs which project from the walls of the corrugations 2. The walls of the corrugations 2 are also formed with obliquely extending regularly spaced flutes 4, each of which is arranged to project from the concave side of its associated corrugation 2. Each flute 4 is substantially semi-cylindrical in form.

Some of the corrugations are formed at their peaks or in their troughs with cylindrical dimples 5 which, since the packing is of sheet material, appear on the reverse side of the sheet as cylindrical projections.

In order to form a packing, e.g. for a cooling tower, several of the packing sheets 1 described above are assembled together so that the segmental cross-sections or corrugations 2 of adjacent sheets register to form tubes 8 which in cross-section are regular hexagons, and the packing formed from an assembly of sheets thus consists of a regularly spaced series of hexagonal tubes 8, as shown in FIG. 5. The packing sheets register together by means of the location of the cylindrical projections on one sheet in the corresponding cylindrical dimples 5 of adjacent sheets and the sheets are held together by a surrounding frame 7 (FIG. 9), which may be of metal angle strip.

When the sheets are in abutment one with the other, the corrugations 3 in the peaks of the corrugations 2 together form a series of cylindrical passages 9 communicating between adjacent hexagonal tubes along the lengths thereof. Also the oblique flutes 4 together form continuous helical projections extending into the tubes and along the lengths thereof.

Figure 9:
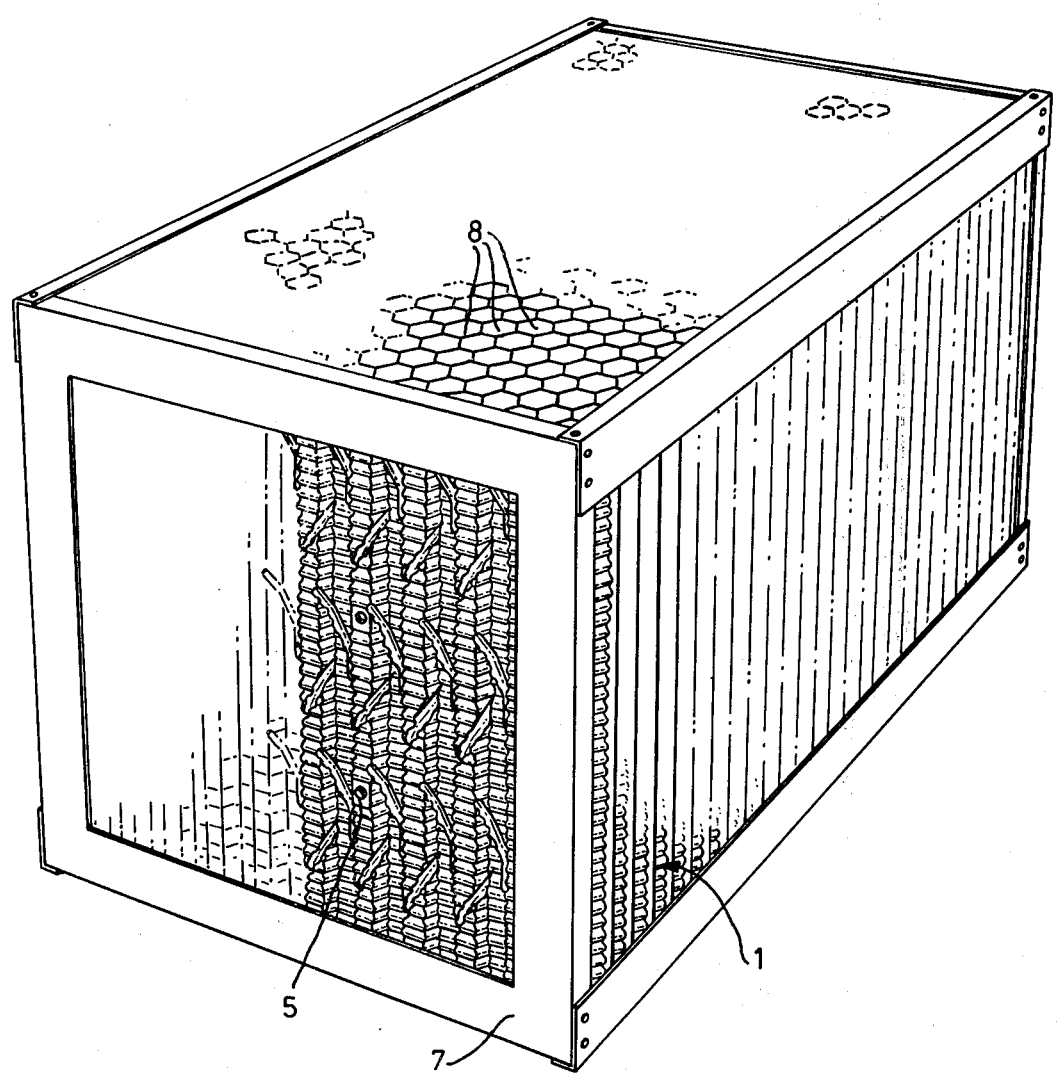
FIG. 9 is a perspective view of a pack composed of the packing sheets shown in FIGS. 1 to 5.

In use of the pack shown in FIG. 9 of the drawings, air or other gaseous medium is passed upwardly through the tubes while a liquid to be contacted therewith is passed downwardly through the tubes as a film over the surface of the tubes. The shaping of the surface of the tubes ensures that the liquid forms an even film in the tubes so that beads of rivulets of liquid are avoided. Local flooding of the tubes is prevented since the passages 9 formed by the corrugations 3 allow surplus liquid to drain into adjacent tubes. The continuous helical projections formed by the flutes 4 form guides which impart a rotary motion to the upwardly passing gas, and I find this to be beneficial to the liquid/gas contact.

I claim:

1. A packing for use in apparatus wherein a film of liquid flows in counter-current to a gas stream to effect contact therebetween, comprising a plurality of packing sheets each of which is corrugated to define a plurality of parallel depressions which are generally segmental in cross-section whereby the sheets when assembled together form tubes and wherein each sheet is deformed to provide channels communicating between the depressions, to provide transverse ribs which project from the walls of the depressions, and to provide obliquely extending projections in the wall of the depressions.

2. A packing according to claim 1, wherein the transverse ribs of each packing sheet form the channels communicating between the depressions.

3. A packing according to claim 1, wherein each packing sheet is formed from a sheet of thermoplastics material.

4. A packing according to claim 1, wherein the ribs of each packing sheet extend substantially continuously across the sheet.

5. A packing according to claim 1, wherein the tubes are hexagonal in cross-section.

6. A packing according to claim 1, wherein the oblique projections form helical guides in the tubes.

7. A packing according to claim 1, wherein the channels between adjacent depressions define liquid paths between the tubes to prevent flooding thereof.

8. Apparatus wherein a film of liquid flows in counter-current to a gas stream to effect contact therebetween comprising a packing as claimed in claim 1.

* * * * *